United States Patent

Lopas

[15] 3,696,708
[45] Oct. 10, 1972

[54] METHOD AND APPARATUS FOR CUTTING THERMOPLASTIC COATED MEMBERS

[72] Inventor: Kasimir Lopas, Stamford, Conn.

[73] Assignee: Time, Incorporated, New York, N.Y.

[22] Filed: Dec. 18, 1969

[21] Appl. No.: 886,314

[52] U.S. Cl. ................ 90/11 C, 29/566, 29/105, 83/3, 90/11 R, 144/39
[51] Int. Cl. .................................................. B27b 5/04
[58] Field of Search ........... 144/39, 235, 134 C; 83/3; 29/105, 339, 566, 527.1; 90/11, 11 C; 156/267, 268

[56] References Cited

UNITED STATES PATENTS

| 457,898 | 8/1891 | Cummings | 29/105 |
| 932,373 | 8/1909 | Burns et al | 144/39 |
| 3,470,598 | 10/1969 | Beethelsen | 29/527.1 X |
| 1,242,662 | 10/1917 | Dunham | 90/11 |
| 985,272 | 2/1911 | Miller | 144/39 X |

Primary Examiner—Andrew R. Juhasz
Assistant Examiner—Z. R. Bilinsky
Attorney—Brumbaugh, Graves, Donohue & Raymond

[57] ABSTRACT

Burr-free fast cutting or machining of workpieces with thermoplastic layers bonded to harder backing members. Both the thermoplastic and its backing member are contacted by a high speed tool, and the thermoplastic layer is trimmed before the produced heat softens or melts the thermoplastic at the trim location. A high speed tool is used which is capable of operating upon the harder member. Offset from the workpiece contacting portion of the high speed tool, one or more trimming teeth trim the thermoplastic layer at intervals inwardly of the machined workpiece area where the thermoplastic is yet to be heated significantly and softened. The high speed tool may be a multitooth rotary cutter blade supporting a single offset tooth.

9 Claims, 7 Drawing Figures

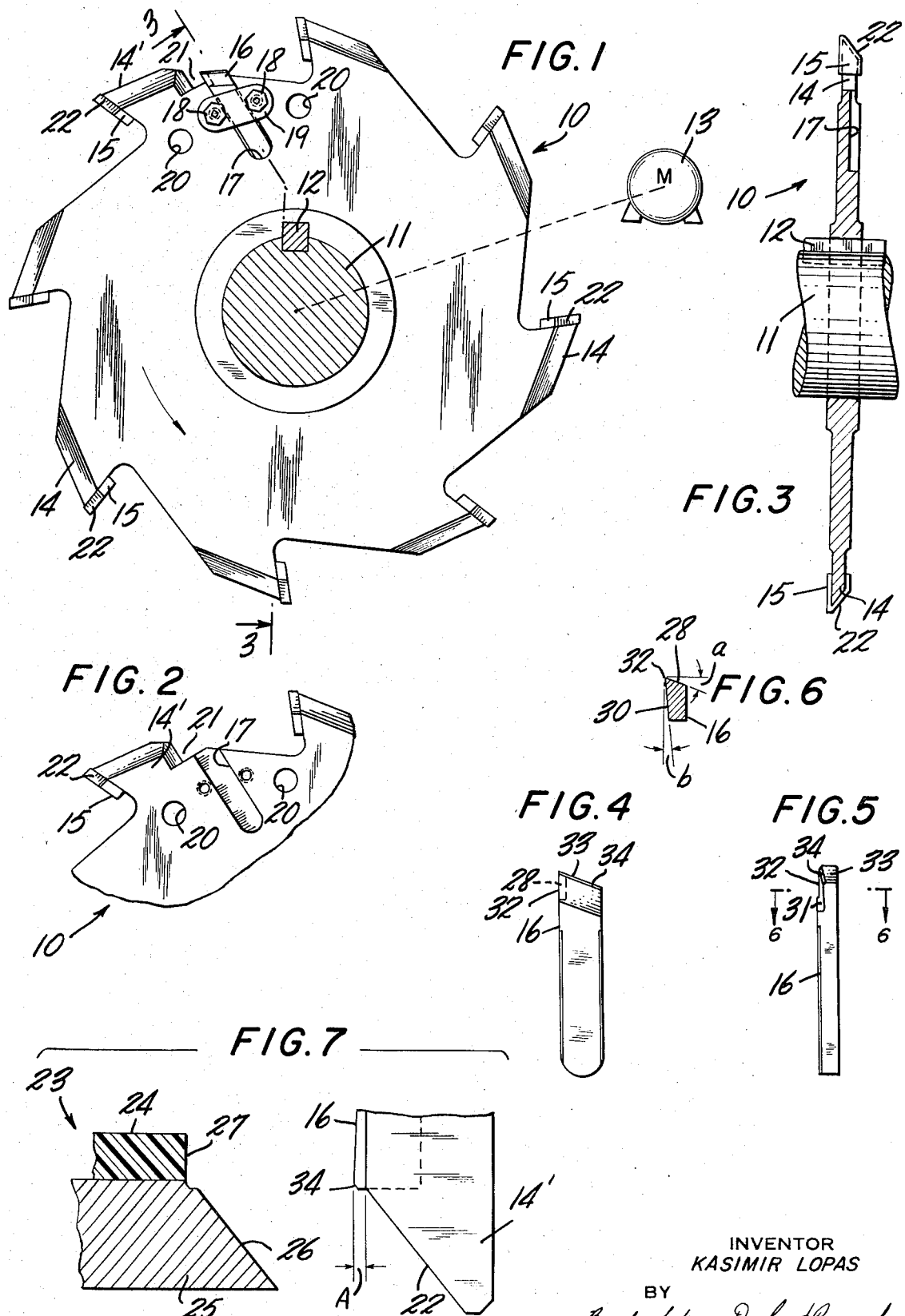

METHOD AND APPARATUS FOR CUTTING THERMOPLASTIC COATED MEMBERS

BACKGROUND OF THE INVENTION

This invention relates to cutting or machining methods and apparatus and relates more particularly to methods and apparatus for cutting or machining workpieces with thermoplastic layers bonded to members of relatively hard material. 36 heat When thermoplastic layers are bonded on harder members, of metal for example, both of which then must be cut or machined to size, difficulties arise. For production rate machining, the harder material generally requires a high speed tool which heats the workpiece. The thermoplastic layer burrs where the workpiece is machined, because the heat at the cut softens or melts the thermoplastic where it is contacted by the high speed tool.

In the printing art, for example, recent developments make use of nylon blanks bonded to aluminum backing members or plates. Following bonding of the nylon to the aluminum, it is desired to cut or trim the combined blanks to the appropriate size. For production rate cutting of aluminum, a suitable rotary blade has hardened, relatively high speed cutting edges which burr the heat softened nylon at the cut as they move repeatedly past the nylon. To cut nylon cleanly, slow tool speeds have been prescribed. Thus, where bonded together layers of thermoplastic material and much harder material are to be cut with a resultant clean or burr-free edge at the thermoplastic layer, two apparently incompatible tool speed requirements are encountered.

SUMMARY OF THE INVENTION

It is an object of this invention to provide a method for cutting or machining articles having a layer of thermoplastic material secured to a member of harder material, while avoiding the difficulties mentioned above.

Similarly, an object of the invention is to provide apparatus which overcomes the aforementioned difficulties which are encountered when cutting or machining articles of the character described.

A further object of this invention is the provision of methods and apparatus for cutting or machining workpieces having a thermoplastic layer secured to a harder member, the cutting or machining of which produces heat, and by which methods and apparatus the thermoplastic layer is trimmed at a substantially cool or unsoftened location while the harder member is being cut or machined.

Another object of the invention is the provision of methods and apparatus in which combined workpieces of the character described are contacted by a high speed tool while the thermoplastic is trimmed at a location slightly removed from the location at which the high speed tool contacts the workpiece.

An additional object of the invention is to provide methods and apparatus for cutting or machining combined workpieces of thermoplastic and much harder material in which a substantially clean or burr-free thermoplastic edge is produced despite a high speed, heat producing cutting or machining operation.

Still another object of the invention is the production, by a single pass of a blade or tool, of a substantially clean or burr-free edge on combined members of the type described.

These, and other objects of the invention as will appear below are provided by the combination of a high speed tool, suitable for cutting, grinding, or other machining of relatively hard members, and one or more slightly offset trimming edges. One or more offset teeth provide the trimming edge or edges which clean or trim the thermoplastic layer where it is substantially unheated.

In the preferred embodiment described below, the high speed blade is a rotary multitooth saw cutter. The number of offset trimming teeth is far less than the number of cutting teeth. Thus, the trimming tooth or teeth trim the thermoplastic at intervals while the cutter rotates. The thermoplastic is trimmed at a location slightly inward from the fresh cut produced by the rotary blade. The offset distance of the trimming tooth or teeth and the feed speed of the combined tool are selected to provide trimming of the thermoplastic before the heat transferral rate in the combined workpiece has caused substantial softening of the thermoplastic at the line of trim. The trimming tooth or teeth are sharpened at their leading edges to produce a clean cut of the thermoplastic without substantial drag, but also to avoid chipping or excessive dulling by engagement with the harder member. The single trimming tooth of the preferred embodiment is mounted directly on the high speed, multitooth blade. A single pass of the cutter results in a correctly cut workpiece and a burr-free thermoplastic edge.

IN THE DRAWINGS

FIG. 1 is an elevational view, partly in section and partly diagrammatic, which shows a multitooth rotary cutter blade supporting an offset trimming tooth.

FIG. 2 is a fragmentary elevational view showing that portion of the rotary blade of FIG. 1 which supports the trimming tooth.

FIG. 3 is a fragmentary sectional view, taken along the line 3—3 of FIG. 1, showing a trimming tooth receiving slot on the rotary blade.

FIG. 4 is a front elevational view of the offset trimming tooth.

FIG. 5 is a side elevational view of the trimming tooth.

FIG. 6 is a sectional view, taken along the line 6—6 of FIG. 5 and shows the forward cutting edge of the trimming tooth.

FIG. 7 is a fragmentary sectional view of a freshly cut, combined thermoplastic and metallic workpiece aligned with the cutting edges of the trimming tooth and the rotary blade.

DESCRIPTION OF PREFERRED EMBODIMENT

In FIG. 1, a multitooth rotary cutter blade 10 is shown, supported upon a shaft 11. The blade 10 is keyed to the shaft conventionally by a key 12 which is received in aligned keying slots on both shaft and blade. A suitably selected motor 13, coupled to the shaft 11, drives the blade 10 in the direction of the unnumbered arrow thereon. The blade 10 may be a commercially available saw cutter, selected in accordance with the dimensions and properties of the material to be cut. For cutting metal, the cutter may be selected with carbide tips 15 secured to the leading edges of peripheral cutting teeth 14.

To produce a cleanly cut edge on thermoplastic layers bonded to harder members, an offset trimming tooth 16 is secured to the blade 10. A slot 17, formed on the face of the blade and best shown in FIGS. 2 and 3, receives the tooth 16. Secured to the body of the cutter blade by a pair of screws 18, a clamping plate 19 spans the slot 17 and clamps the tooth 16 securely within the slot. If desired, the body of the offset trimming tooth 16 may be engaged directly by the heads of the screws 18, or any convenient locking arrangements may be used to secure the trimming tooth to the rotary blade. Two holes 20 balance the blade by compensating the added weight at the tooth 16.

At its cutting edge, the tooth 16 extends slightly from the slot 17, beyond the body of the blade 10. The thickness of the workpiece layer to be trimmed by the tooth 16 determines the distance the cutting end of the tooth extends. A portion of the trailing edge of an adjacent cutter tooth 14' is removed to form an open area 21 at the cutting edge of the offset tooth 16. Material trimmed from the workpiece by the trimming tooth 16 is thus freed for expulsion past the trimming tooth through the open area 21, and the cutting edge of the tooth 16 is less subject to being heated by proximity to the tooth 14'.

The teeth 14 of the blade 10 are sharpened to form side surfaces 22 extending diagonally away from the blade face in which the offset trimming tooth 16 is mounted. FIG. 7 shows this. There, a workpiece 23 includes a thermoplastic layer 24 bonded to a metallic member or plate 25. The workpiece 23 has been cut along its right side by the cutter of FIG. 1. The plate 25 has a bevelled side surface 26 conforming to the side surfaces 22 of the teeth 14. The bevelled side surface 26 slopes outwardly from the body of the workpiece 23, away from the thermoplastic layer 24.

The cutting edge of the trimming tooth 16 is offset a distance A from the cutting edges of the teeth 14. The tooth 16 produces a trimmed edge 27, free of burrs, on the thermoplastic layer 24. While trimming, the tooth 16 grazes the surface of the metal plate 25 to which the thermoplastic layer 24 is bonded.

FIGS. 4 through 6 illustrate the offset tooth 16, sharpened to tolerate grazing of the plate 25 while producing a substantially clean thermoplastic edge. The forward face 28 of the trimming tooth is ground at an angle $a$ of about 10° to 30°. The tooth side surface 30 which faces the workpiece is ground at a very slight angle $b$ and is undercut somewhat as shown at 31. So ground, the surfaces 28 and 30 intersect at a cutting edge 32 which is sufficiently sharp to minimize drag as the tooth moves through the thermoplastic layer 24, yet is sufficiently sturdy to resist chipping and premature dulling. A further grind at the intersection 34 of the side surface 30 and the tooth end surface 33 dulls, but strengthens, the tooth at the edge which grazes the harder member 25.

The single offset tooth 16 cuts the thermoplastic 24 once per rotation of the cutter blade 10. The cutter feed velocity and the offset distance A are selected to provide trimming of the thermoplastic layer 24 before the heat produced in cutting the plate 25 has caused any substantial softening or melting of the thermoplastic where the thermoplastic is trimmed.

Since the feed velocity is limited by such factors as hardness and thickness of the harder workpiece member, the offset distance A may be varied accordingly for various workpieces, to provide best results. That is to say, for decreased cutter feed velocities, the offset distance A may need to be increased to assure that each trimming cut by the trimming tooth 16 occurs before the thermoplastic has significantly been softened at the trim location. Also, mounting one or more additional offset trimming teeth on the cutter may be desired to increase the occurrence of trimming cuts beyond one per rotation of the rotary blade or to reduce the rate of dulling of the trimming teeth. Usually, however, far fewer trimming teeth 16 will be required than cutter teeth 14. Hence, the thermoplastic is contacted less by the trimming edge or edges, than by the teeth of the multitooth blade to further lesser the likelihood of burring.

As indicated, variations from the specific preferred embodiment illustrated will be apparent to persons skilled in the art to allow for differing workpieces or differing machining operations. In a specific application, the rotary blade described above was used successfully to cut a workpiece 23 having a nylon layer 24 approximately 0.08 inch thick, bonded to an aluminum plate approximately 0.19 inch thick. A carbide tipped saw cutter blade, 5 inches in diameter from tooth tip to tooth tip, commercially available from Browne and Sharp, was modified as shown. The blade was driven at 3,600 R.P.M. in a climb cut direction with a feed velocity of 3.1 inches per second. A single tooth 16 gave 0.05 inch trimming cuts at 0.015 second intervals. An offset distance A of approximately 0.02 inch produced a clean nylon edge, free of burrs. Angles $a$ and $b$, shown in FIG. 6, were selected at 20° and 2°, respectively, to give proper trimming and tool life. This exemplary arrangement gave entirely satisfactory results.

It will be seen from the foregoing, that a method has been provided by which bonded together members of thermoplastic and much harder material may be cut or machined with a single pass of a high speed tool. Burring of the thermoplastic is avoided despite heating of the workpiece, and production feed rates are made possible since the trimming operation allows the application of a high speed tool to the harder material.

Although an exemplary embodiment has been illustrated and described in detail, it will be apparent to those skilled in the art that many modifications may be made in the described arrangements without departure from the spirit and scope of the invention as set forth in the appended claims. For example, the high speed tool may, where desired, be a rotary grinding wheel or the high tool speed may result from movement of a workpiece relative to a selected tool.

Also, in a cutting operation similar to that described, the bevelled surface 26 may be undesirable for a particular purpose. If then, the lower edge of the plate 25 is formed more nearly beneath the thermoplastic edge, an increased offset distance A may be needed to assure that the trim location is sufficiently distant from the cut to prevent softening of the thermoplastic. Other design changes are suggested above. These changes also permit the invention to be adapted to other specific operations without departure from inventive features of the methods and apparatus described.

I claim:

1. Apparatus for cutting workpieces having a layer of thermoplastic material bonded to a metallic member and for producing a substantially clean thermoplastic edge, the apparatus comprising a multitooth rotary saw cutter blade for cutting the thermoplastic and metallic member together, means for rotating the blade in a climb cutting direction, and at least one trimming tooth supported on the blade and having a lesser radial extent than the cutter blade teeth, the trimming tooth being offset for trimming the thermoplastic layer inwardly from the blade produced cut, while the workpiece is being cut, and where the thermoplastic layer has not yet been substantially softened by heat from the cut, the trimming tooth defining a trim cutting edge formed by the leading surface of the tooth sharpened to an angle of about 10° to 20° relative to the axis of rotation to minimize drag in the thermoplastic material and to produce substantially clean thermoplastic trimming cuts, the number of trimming teeth being substantially less than the number of cutter teeth on the blade to trim at intervals as the blade is rotated.

2. The method of machining workpieces of thermoplastic material on members of harder material, the method including the steps of engaging the harder member with a tool to modify the harder member, and trimming the thermoplastic while the harder material member is being engaged, the workpiece being heated and the thermoplastic burred by the step of engaging, and the step of trimming including cutting the thermoplastic at a location proximate the engagement of the harder member by the tool and offset sufficiently to be substantially unsoftened by the heat produced.

3. The method according to claim 2 for machining workpieces in which the harder members are metallic members to which a thermoplastic layer is bonded, wherein the step of engaging includes providing a high speed metal machining tool and the step of trimming includes providing a trimming tool, and further including the step of simultaneously imparting a relative feed between both tools and the workpiece at a feed velocity exceeding the rate at which sufficient heat is conducted through the metallic member to the trim location to cause substantial softening of the thermoplastic at the trim.

4. The method according to claim 2, wherein the step of trimming includes locating at least one sharpened trimming edge offset from the harder member engaging tool to remove the burrs produced.

5. The method according to claim 4, wherein the step of engaging includes bringing a high speed tool into contact with the harder member, and the step of trimming includes locating the cutting edge to move with the tool at an offset distance therefrom sufficient to cause trimming of the thermoplastic before heat produced by the high speed tool substantially softens the thermoplastic where trimmed.

6. The method according to claim 4, wherein the step of trimming further includes repeatedly engaging the trimming edge and thermoplastic to produce trimming at intervals.

7. The method according to claim 2, wherein the step of engaging includes bringing a high speed rotary tool into contact with the harder member, and the step of trimming includes supporting at least one offset trimming tooth on the rotary tool to trim the thermoplastic as the tool rotates.

8. The method according to claim 7, wherein the step of bringing a rotary tool into contact comprises using a multitooth cutter blade, and the step of supporting at least one trimming tooth comprises supporting less trimming teeth than cutting teeth on the multitooth blade to provide interval trimming of the thermoplastic as the blade rotates.

9. The method of cutting workpieces having a layer of thermoplastic material bonded to a metallic member and producing a substantially clean thermoplastic edge, the method comprising the steps of cutting the workpiece along a path, concurrently trimming the thermoplastic layer near the cutting path along a trim line parallel to and sufficiently offset from the cutting path to cause trimming of the thermoplastic before sufficient heat from the cut reaches the trimming location to cause burring at the trim, the step of cutting including engaging a multiedge cutter with the workpiece, the step of trimming including causing a trimming edge to engage the thermoplastic at the trim line intermittently, and the cutting method further including the step of locating the trimming edge on the multiedge cutter to cause the intermittent trimming as the workpiece is cut.

* * * * *